US012647144B2

(12) United States Patent
Moses et al.

(10) Patent No.: US 12,647,144 B2
(45) Date of Patent: Jun. 2, 2026

(54) KERNEL RECOMMENDATION FOR DIGITAL POST DISTORTION CORRECTION

(71) Applicant: QUALCOMM Incorporated, San Diego, CA (US)

(72) Inventors: Amit Moses, Tel Aviv (IL); Ronen Shaked, Kfar Saba (IL); Aviv Regev, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 18/194,531

(22) Filed: Mar. 31, 2023

(65) Prior Publication Data

US 2024/0333324 A1     Oct. 3, 2024

(51) Int. Cl.
H04B 1/10 (2006.01)
H04W 52/04 (2009.01)

(52) U.S. Cl.
CPC .............. H04B 1/10 (2013.01); H04W 52/04 (2013.01)

(58) Field of Classification Search
CPC . H04B 1/02; H04B 1/034; H04B 1/04; H04B 2001/0408; H04B 2001/0416; H04B 1/0475; H04B 1/06; H04B 1/10; H04B 1/16; H04B 1/38; H04B 1/3827; H04B 1/3833; H04B 1/40; H04W 52/04; H04W 52/06; H04W 52/26
See application file for complete search history.

(56) References Cited

U.S. PATENT DOCUMENTS

| | | | | |
|---|---|---|---|---|
| 2013/0260805 A1* | 10/2013 | Park | .................... | H04W 52/52 |
| | | | | 455/501 |
| 2021/0344367 A1* | 11/2021 | Wolf | .................... | H04B 1/0475 |
| 2021/0367686 A1* | 11/2021 | Gutman | .............. | H04B 1/0475 |
| 2022/0312244 A1 | 9/2022 | Landis et al. | | |
| 2022/0312403 A1 | 9/2022 | Landis et al. | | |
| 2023/0014042 A1* | 1/2023 | Barak | .................... | H04B 17/13 |

OTHER PUBLICATIONS

Alina Z., et al., "On Digital Post-Distortion Techniques", IEEE Transactions on Signal Processing, IEEE, USA, vol. 64, No. 3, Feb. 1, 2016, pp. 603-614, XP011595375, The Whole Document.
International Search Report and Written Opinion—PCT/US2024/018638—ISA/EPO—Jun. 13, 2024.

* cited by examiner

*Primary Examiner* — Quochien B Vuong
(74) *Attorney, Agent, or Firm* — Harrrity & Harrity LLP

(57) ABSTRACT

Various aspects of the present disclosure generally relate to wireless communication. Particular aspects of the subject matter described in this disclosure can be implemented to realize one or more of the following potential advantages. In some examples, the described techniques can be used to improve latency and reduce power consumption of a DPoD process performed by the network node. For example, in association with identifying the one or more kernels for the subset of candidate kernels, the network node may consume a reduced amount of power and may identify the one or more kernels with reduced latency, when compared with testing each candidate kernel. Additionally or alternatively, the UE may conserve power resources by using PAs of the UE with reduced power (with an increased NL region) in association with the improved latency of the DPoD process performed by the network node.

30 Claims, 9 Drawing Sheets

400

405
Receive a communication having non-linearity distortion

Second Wireless Communication Device

First Wireless Communication Device

410
Estimate non-linearity from DMRSs of the communication

415
Decode the communication based on the estimated non-linearity

500

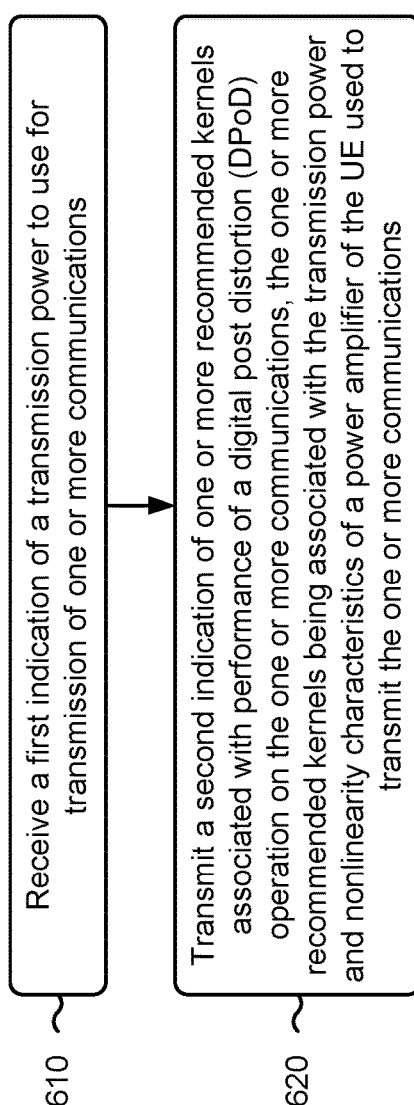

600

610

Receive a first indication of a transmission power to use for transmission of one or more communications

620

Transmit a second indication of one or more recommended kernels associated with performance of a digital post distortion (DPoD) operation on the one or more communications, the one or more recommended kernels being associated with the transmission power and nonlinearity characteristics of a power amplifier of the UE used to transmit the one or more communications

FIGURE 6

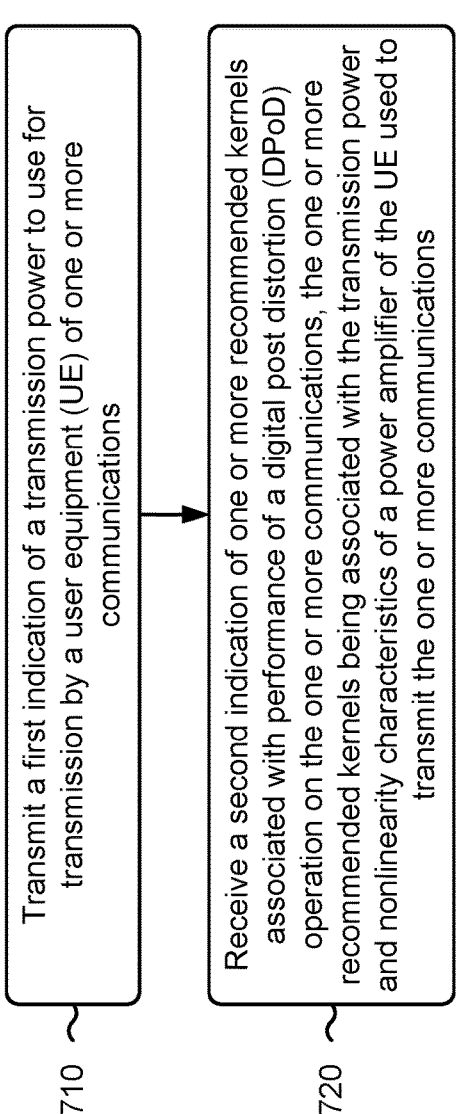

Transmit a first indication of a transmission power to use for transmission by a user equipment (UE) of one or more communications Receive a second indication of one or more recommended kernels associated with performance of a digital post distortion (DPoD) operation on the one or more communications, the one or more recommended kernels being associated with the transmission power and nonlinearity characteristics of a power amplifier of the UE used to transmit the one or more communications

KERNEL RECOMMENDATION FOR DIGITAL POST DISTORTION CORRECTION

FIELD OF THE DISCLOSURE

Aspects of the present disclosure generally relate to wireless communication and specifically, to techniques and apparatuses for kernel recommendation for digital post distortion correction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Some wireless communication devices, such as a user equipment (UE) or a network entity or node (such as a base station) may transmit and receive wideband communications (for example, having bandwidths of 1 GHz to 10 GHz) or transmit and receive communications at high frequencies (for example, SubThz frequencies). Transmitting at high frequencies or with wide bandwidths may increase a consumption of power resources of the transmitting wireless communication device as compared to transmitting using LTE or sub-6 GHz frequency ranges. To reduce power consumption, the transmitting device may reduce a power supplied (for example, apply a backoff) to a power amplifier (PA), which may reduce power consumption at a cost of the PA operating with a reduced linear region. A linear region of a PA refers to a range of power values that may be input to the PA for which the associated power values output from the PA increase linearly with an increase in the input power values. When a PA operates in a non-linear region, the output power is not linearly related to the input power, which may cause the wireless communication device to transmit a signal with an unintended reduced power. In such case, a receiving device may have increased demodulation and decoding errors (for example, when mapping a sample of the received signal to a constellation point associated with a configured modulation scheme).

In some networks, a receiving device may perform digital post-distortion (DPoD) on a received signal, in which the receiving device performs nonlinearity estimation and correction. In this way, the receiving device may reduce demodulation and decoding errors that may have otherwise been caused by the PA of the transmitting device operating in a nonlinear region. Similarly, the receiving device may estimate the nonlinearity and provide feedback to the transmitting device. The transmitting device may then use the feedback to correct for effects of the nonlinearity before transmitting a communication.

SUMMARY

Some aspects described herein relate to a method of wireless communication performable by a user equipment (UE). The method may include receiving a first indication of a transmission power to use for transmission of one or more communications. The method may include transmitting a second indication of one or more recommended kernels associated with performance of a digital post distortion (DPoD) operation on the one or more communications, the one or more recommended kernels being associated with the transmission power and one or more nonlinearity characteristics of a power amplifier of the UE used to transmit the one or more communications.

Some aspects described herein relate to a method of wireless communication performable by a network node. The method may include transmitting a first indication of a transmission power to use for transmission by a UE of one or more communications. The method may include receiving a second indication of one or more recommended kernels associated with performance of a DPoD operation on the one or more communications, the one or more recommended kernels being associated with the transmission power and nonlinearity characteristics of a power amplifier of the UE used to transmit the one or more communications.

Some aspects described herein relate to a UE for wireless communication. The UE may include at least one memory and at least one processor communicatively coupled with the at least one memory. The at least one processor may be operable to cause the UE to receive a first indication of a transmission power to use for transmission of one or more communications. The at least one processor may be operable to cause the UE to transmit a second indication of one or more recommended kernels associated with performance of a DPoD operation on the one or more communications, the one or more recommended kernels being associated with the transmission power and nonlinearity characteristics of a power amplifier of the UE used to transmit the one or more communications.

Some aspects described herein relate to a network node for wireless communication. The network node may include at least one memory and at least one processor communicatively coupled with the at least one memory. The at least one processor may be operable to cause the network node to transmit a first indication of a transmission power to use for transmission by a UE of one or more communications. The at least one processor may be operable to cause the network node to receive a second indication of one or more recommended kernels associated with performance of a DPoD operation on the one or more communications, the one or more recommended kernels being associated with the transmission power and nonlinearity characteristics of a power amplifier of the UE used to transmit the one or more communications.

Some aspects described herein relate to a non-transitory computer-readable medium that stores a set of instructions for wireless communication by a UE. The set of instructions, when executed by one or more processors of the UE, may cause the UE to receive a first indication of a transmission power to use for transmission of one or more communications. The set of instructions, when executed by one or more processors of the UE, may cause the UE to transmit a second indication of one or more recommended kernels associated with performance of a DPoD operation on the one or more communications, the one or more recommended kernels being associated with the transmission power and nonlinearity characteristics of a power amplifier of the UE used to transmit the one or more communications.

Some aspects described herein relate to a non-transitory computer-readable medium that stores a set of instructions for wireless communication by a network node. The set of instructions, when executed by one or more processors of the network node, may cause the network node to transmit a first indication of a transmission power to use for transmission by a UE of one or more communications. The set of instructions, when executed by one or more processors of the network node, may cause the network node to receive a second indication of one or more recommended kernels associated with performance of a DPoD operation on the one or more communications, the one or more recommended kernels being associated with the transmission power and nonlinearity characteristics of a power amplifier of the UE used to transmit the one or more communications.

Some aspects described herein relate to an apparatus for wireless communication. The apparatus may include means for receiving a first indication of a transmission power to use for transmission of one or more communications. The apparatus may include means for transmitting a second indication of one or more recommended kernels associated with performance of a DPoD operation on the one or more communications, the one or more recommended kernels being associated with the transmission power and nonlinearity characteristics of a power amplifier of the apparatus used to transmit the one or more communications.

Some aspects described herein relate to an apparatus for wireless communication. The apparatus may include means for transmitting a first indication of a transmission power to use for transmission by a UE of one or more communications. The apparatus may include means for receiving a second indication of one or more recommended kernels associated with performance of a DPoD operation on the one or more communications, the one or more recommended kernels being associated with the transmission power and nonlinearity characteristics of a power amplifier of the UE used to transmit the one or more communications.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, that supports kernel recommendation for DPoD correction in accordance with the present disclosure.

FIG. 7 is a diagram illustrating an example process performed, for example, by a network node, that supports kernel recommendation for DPoD correction in accordance with the present disclosure.

DETAILED DESCRIPTION

Figure 1:
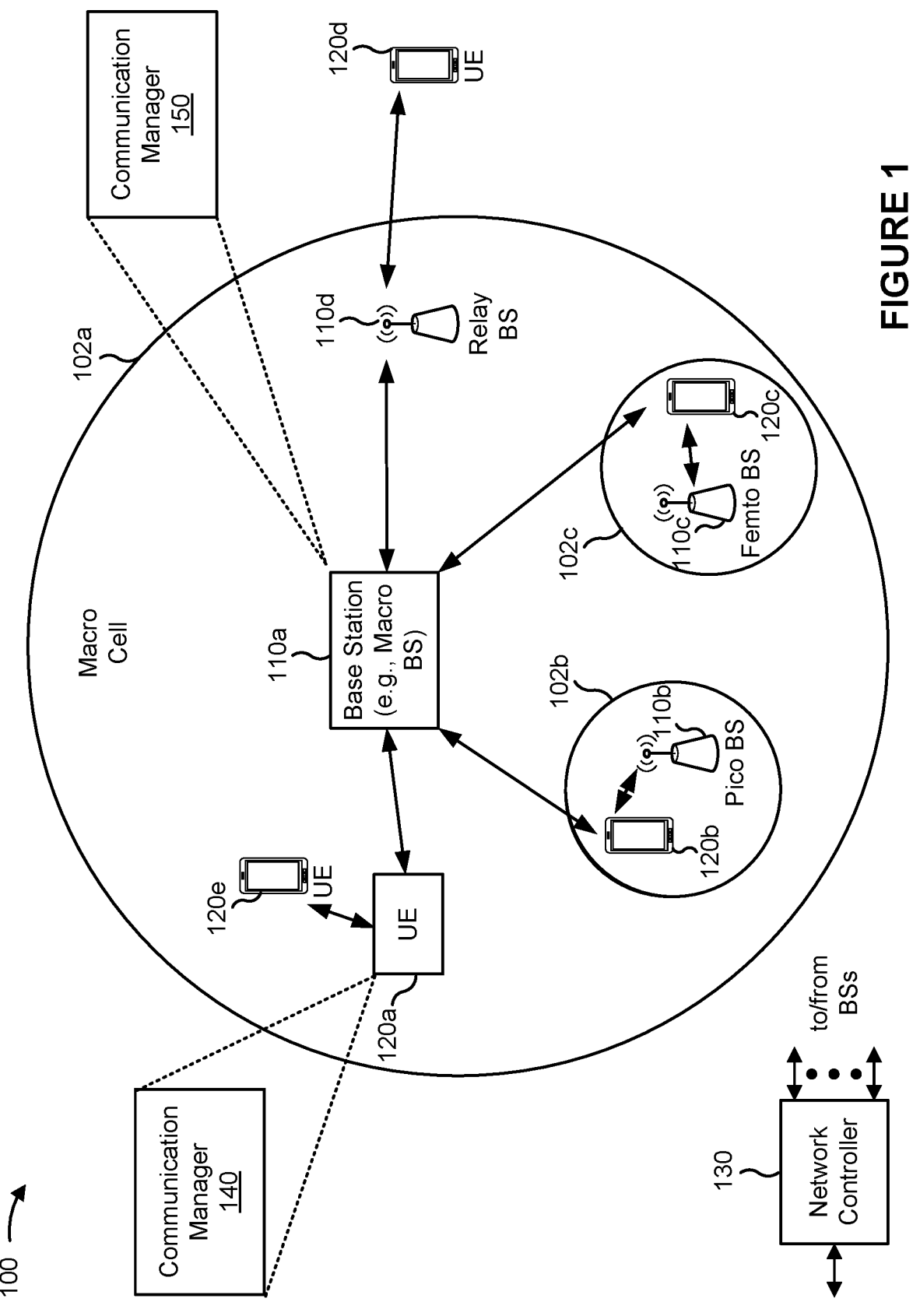
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to performing digital post-distortion (DPoD) using a subset of candidate kernels. Kernels include functions that are used to mathematically describe a non-linear output of a power amplifier (PA). For example, the candidate kernels may have different orders, such as $x|x|^2$ (a third order kernel), $x|x|^4$ (a fifth order kernel), or $x|x|^6$ (a seventh order kernel), among other examples. Some aspects more specifically relate to a user equipment (UE) transmitting an indication of the subset of candidate kernels to a network node, which then identifies one or more kernels from the subset of candidate kernels and uses the one or more kernels for performing DPoD on a set of subsequent communications transmitted to the network node by the UE. In some aspects, the UE may receive an indication of a transmission power to use for transmitting the set of communications and may identify the subset of candidate kernels in association with the transmission power. Additionally or alternatively, the UE may identify the subset of candidate kernels in association with nonlinearity (NL) characteristics of a PA of the UE used to transmit the set of communications. For example, the UE may identify the subset of candidate kernels in association with both the transmission power and the NL characteristics of the PA of the UE. In some aspects, the UE may identify the NL characteristics of the PA in an offline (such as in a test environment) measurement operation. In some aspects, the PAs may be tested and measured by another device and provided to the UE.

Particular aspects of the subject matter described in this disclosure can be implemented to realize one or more of the following potential advantages. In some examples, the described techniques can be used to improve latency and reduce power consumption of a DPoD operation performed by the network node. For example, in association with identifying the one or more kernels from the subset of candidate kernels, the network node may consume a reduced amount of power and may identify the one or more kernels with reduced latency, as compared with testing each candidate kernel of an entire set of candidate kernels. Additionally or alternatively, the UE may conserve power resources by using PAs of the UE with reduced power, or may use reduced capability PAs (with an increased nonlinear region)

that may not be suitable for use without the improved latency of the DPoD operation performed by the network node.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120c), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station May be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and May operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120c) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a first indication of a transmission power to use for transmission of one or more communications; and transmit a second indication of one or more recommended kernels associated with performance of a DPoD operation on the one or more communications, the one or more recommended kernels being associated with the transmission power and nonlinearity characteristics of a power amplifier of the UE used to transmit the one or more communications. Additionally, or alternatively, the communication manager 140 may perform one or more other operations described herein.

In some aspects, the network node may include a communication manager 150. As described in more detail elsewhere herein, the communication manager 150 may transmit a first indication of a transmission power to use for transmission by a UE of one or more communications; and receive a second indication of one or more recommended kernels associated with performance of a DPoD operation on the one or more communications, the one or more recommended kernels being associated with the transmission power and nonlinearity characteristics of a power amplifier of the UE used to transmit the one or more communications. Additionally, or alternatively, the communication manager 150 may perform one or more other operations described herein.

Figure 2:
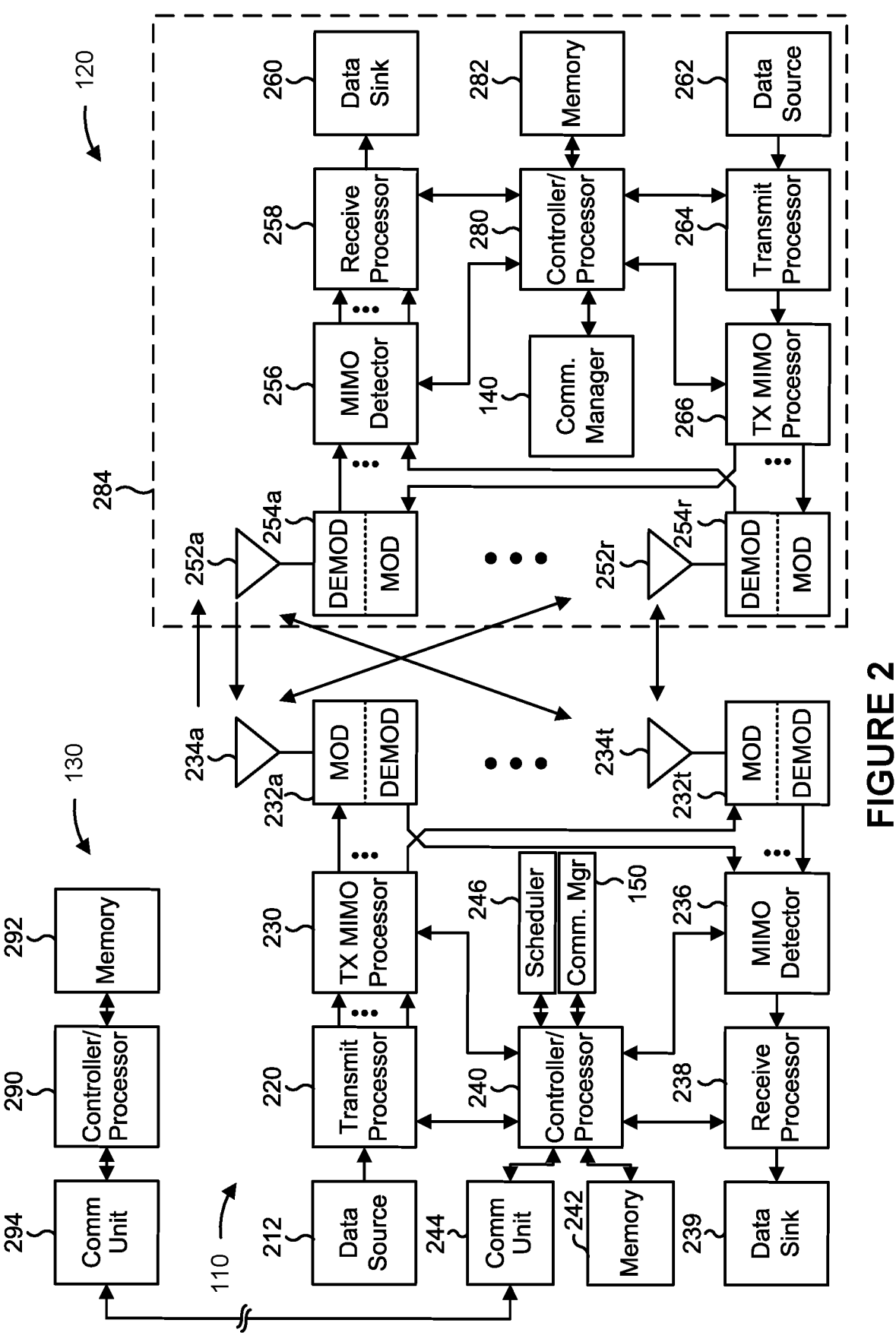
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with kernel recommendation for DPoD correction, as described in more detail elsewhere herein. For example, the controller/processor 240 of the network node 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

In some aspects, the UE includes means for receiving a first indication of a transmission power to use for transmission of one or more communications; or means for transmitting a second indication of one or more recommended kernels associated with performance of a DPoD operation on the one or more communications, the one or more recommended kernels being associated with the transmission power and nonlinearity characteristics of a power amplifier of the UE used to transmit the one or more communications. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting a first indication of a transmission power to use for transmission by a UE of one or more communications; or means for receiving a second indication of one or more recommended kernels associated with performance of a DPoD operation on the one or more communications, the one or more recommended kernels being associated with the transmission power and nonlinearity characteristics of a power amplifier of the UE used to transmit the one or more communications. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
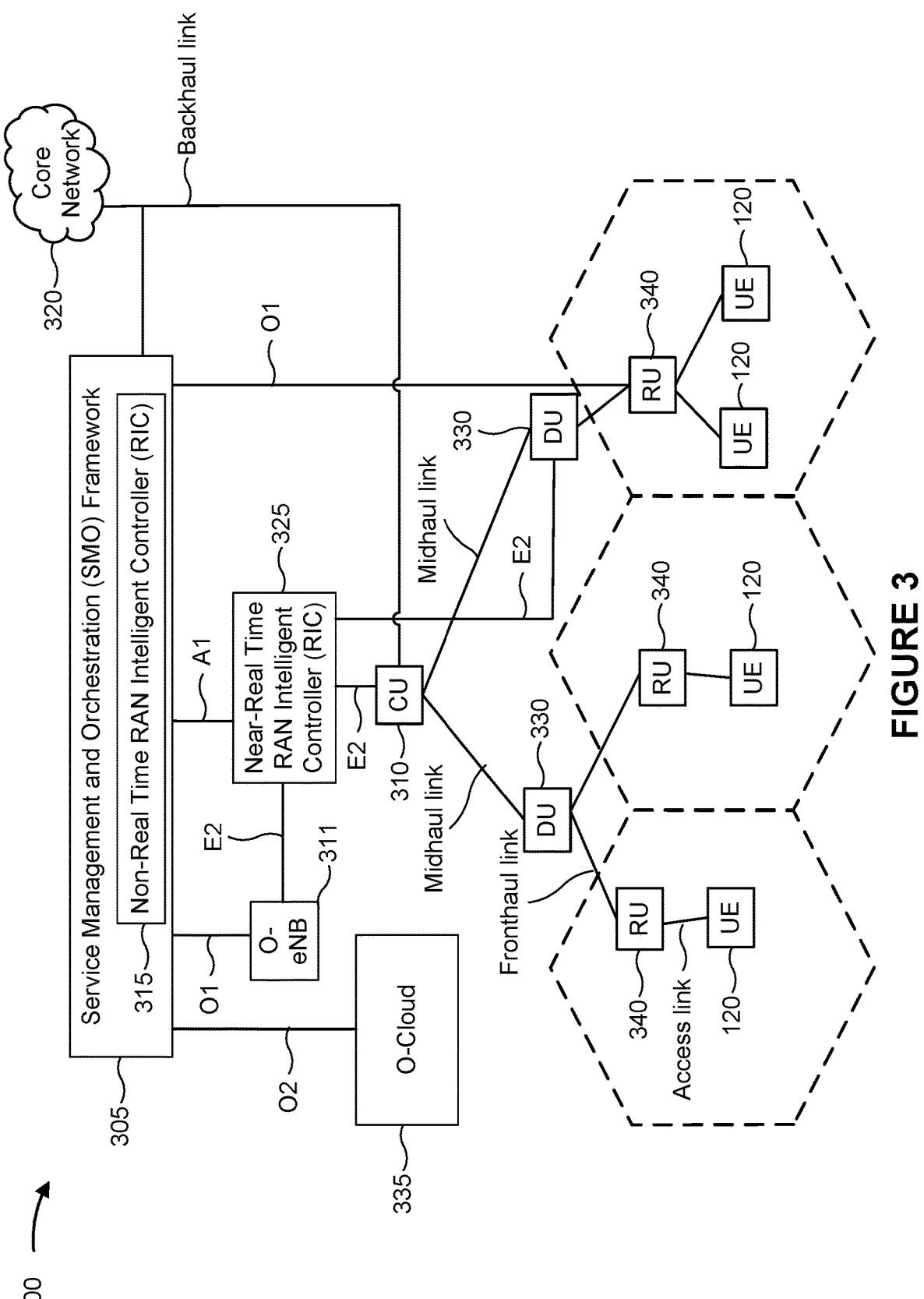
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open CNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
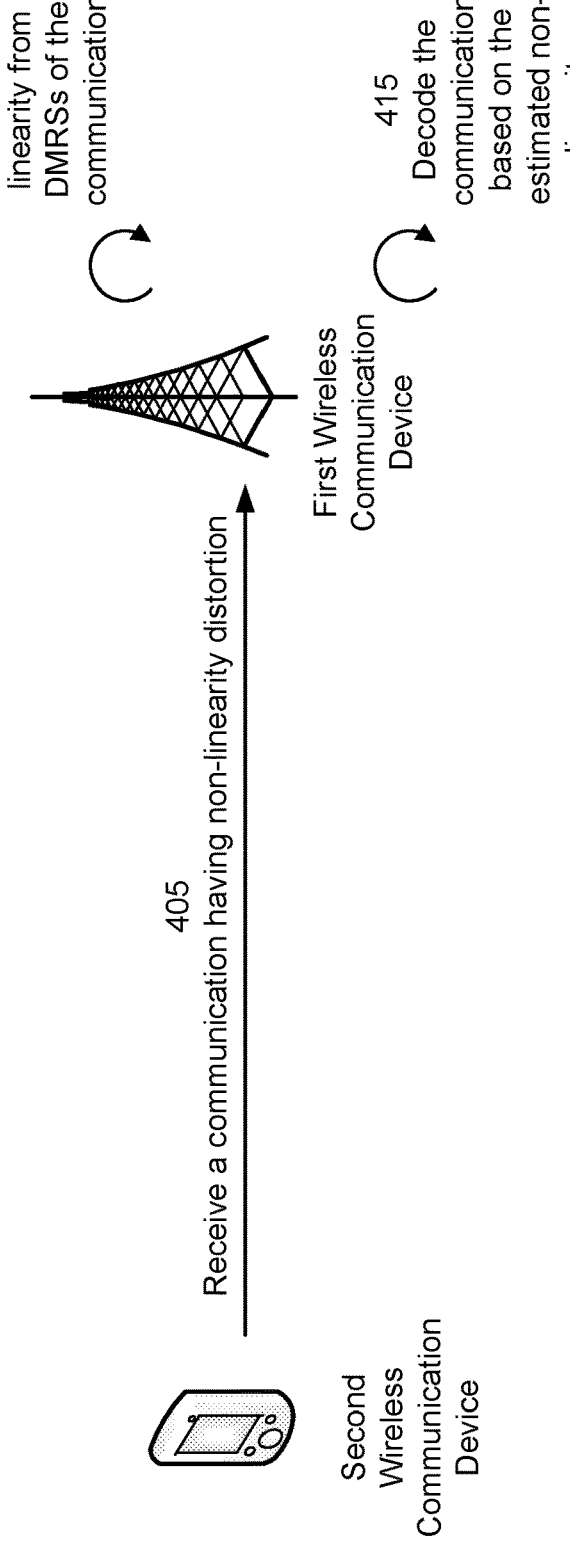
FIG. 4 is a diagram illustrating an example of communicating using nonlinear (NL) distortion, in accordance with the present disclosure.

FIG. 4 is a diagram illustrating an example 400 of communicating using NL distortion, in accordance with the present disclosure. As shown in FIG. 4, a first wireless communication device (WCD) and a second WCD may communicate based on transmitting communications with NL distortion and attempting to decode communications with NL distortion. The first WCD may include or may be included in a network node (for example, network node 110) or a UE (for example, network node 110 or a repeater). The second node may include or may be included in a UE (for example, UE 120) or a network node (for example, network node 110 or a repeater).

As shown by reference number 405, the second WCD may transmit, and the first WCD may receive, a communication having NL distortion. The second WCD may transmit the communication having NL distortion based on the second WCD using non-linear components, such as high-power PAs with limited linear dynamic range (DR), and a polynomial response. The NL distortions may be classified as in-band distortion, which affects a link performance (for example, an error vector magnitude (EVM)), and an out-band distortion, which corresponds to an amount of adjacent channel interference (ACI).

To reduce NL distortions, power output back-off (boOut) may be used to reduce a transmission power used to transmit the communication. However, an increase in boOut may cause a reduction in power amplifier efficiency (PAE). The reduction of PAE may correspond to a reduction of power transmitted on the channel and an increase in energy dissipated as heat.

As shown by reference number 410, the second node may estimate NL of the communication using DMRSs or other reference signals of the communication. For example, the second node may use a sequence associated with the DMRSs to estimate NL distortion of the signal and to correct a received signal for the NL distortion. This may include DPoD correction.

As shown by reference number 415, the second node may decode the communication based on the estimated NL of the communication.

As indicated above, FIG. 4 is provided as an example. Other examples may differ from what is described with regard to FIG. 4.

As described herein, some wireless communication devices may transmit communications using wideband communications (for example, 1 GHZ to 10 GHZ) or at high frequencies (for example, SubThz frequencies). Transmitting at high frequencies or with wideband communications may increase consumption of power resources of the wireless communication device when compared to transmitting using LTE or sub-6 GHZ frequency ranges. To reduce power consumption, a wireless communication device may reduce the power supply to a PA, which may reduce power consumption at a cost of a reduced linearity region. A linearity region is a range of power inputs to the PA for which increasing an input power linearly increases an output power. When a PA transmits signals of a communication in a non-linearity region, output power may not be linearly mapped to input power, which may cause the wireless communication device to transmit the signals with an unintended reduced power. In this case, a receiving device may have increased demodulation and decoding errors (for example, when mapping a sample of the signal to a constellation point in configured modulation scheme).

In some networks, a receiving device may perform DPoD (used herein interchangeably with DPoD correction) on the communication, in which the receiving device performs nonlinearity estimation and correction. In this way the receiving device may reduce demodulation and decoding errors that may have otherwise been caused by nonlinearity of the PA. Similarly, the receiving device may estimate the nonlinearity and provide feedback to the wireless communication device. The wireless communication device may then use the feedback to correct effects of the nonlinearity before transmitting the communications.

However, performing DPoD may include testing all candidate kernels to identify an NL of a communication. This may consume power resources of the receiving device and may cause latency in decoding and demodulating the communication. This may result in a failure to decode in time to transmit hybrid automatic repeat request (HARQ) feedback or otherwise communicate with the wireless communication device.

In some aspects described herein, a UE may transmit an indication of a subset of candidate kernels and a network node may identify one or more kernels from the subset of candidate kernels, and use the one or more kernels for performing DPoD on a set of communications. In some aspects, the UE may receive an indication of a transmission power to use for transmitting the set of communications and may identify the subset of candidate kernels in association with the transmission power. Additionally or alternatively, the UE may identify the subset of candidate kernels in association with NL characteristics of a PA of the UE used to transmit the set of communications. For example, the UE may identify the subset of candidate kernels in association with the transmission power and the NL characteristics of the PA of the UE. In some aspects, the UE may identify the NL characteristics of the PA in an offline (such as in a test environment) measurement operation.

Particular aspects of the subject matter described in this disclosure can be implemented to realize one or more of the following potential advantages. In some examples, the described techniques can be used to improve latency and reduce power consumption of a DPoD process performed by the network node. For example, in association with identifying the one or more kernels for the subset of candidate kernels, the network node may consume a reduced amount of power and may identify the one or more kernels with reduced latency, when compared with testing each candidate kernel. Additionally or alternatively, the UE may conserve power resources by using PAs of the UE with reduced power (with an increased NL region) in association with the improved latency of the DPoD process performed by the network node.

In association with the UE indicating the subset of candidate kernels, the UE and network node may reduce a complexity and latency of a DPoD process at the network node without corrupting a demodulation EVM. In some aspects, the network node may establish signaling for the UE to inform the network node, per each UE transmission power, a recommendation for a set of non-linear kernels. Once kernel selection has been recommended, the network node may perform DPoD (for example, DPoD estimation and correction) in association with (for example, based on) the recommended set.

In some aspects, the UE may perform an offline or factory calibration process to identify optimal (for example in a sense of minimal set size) kernel set per each UE transmission power. When connected to the network node, the UE may receive an indication of a transmission power to use for one or more communications. The UE may transmit an indication (for example, by providing signaling) in an uplink channel (for example, physical uplink control channel (PUCCH) or physical uplink shared channel (PUSCH)) of currently recommended kernels to use for DPoD at the network node.

In some aspects, in association with the UE changing uplink transmission power, the UE may transmit an indication of a new recommended set of kernels (for example, an update to the recommended set). In some aspects, the UE may transmit the indication of the new recommended set only if the new recommended set is different from a current (previously indicated) recommended set. The network node may use the recommended set of kernels in a DPoD unit of the network node to perform DPoD.

In some aspects, the UE may indicate the recommended set using multiple communications. For example, the UE may provide an indication of candidate sets (for example, in an RRC communication), and may provide a dynamic indication to select the subset from the candidate sets (for example, a proper subset), with the subset being the recommended set. In some aspects, the indication of the recommended set may include a codepoint that indicates the recommended set. In some aspects, the indication of the recommended set may include a bit map with bits being associated with respective candidate kernels.

In some aspects, the UE may transmit an update to the recommended set in association with a change of transmission power, a transmission beam used, or a PA used to transmit subsequent communications.

An example, of a process of identifying recommended sets for different transmission powers may include an offline (for example, in factory) kernel selection procedure to determine which kernels are needed for approximating a PA NL model per each transmission power. An example of a PA's non-linearity can be expressed mathematically as $$f(x) = \frac{x}{\left(1 + \left(\frac{|x|}{\alpha}\right)^{2\rho}\right)^{\frac{1}{2\rho}}}$$

where x is an input signal and p and a are functions of nonlinearity characteristics of the PA. The parameters a and p may be different for each PA, so every UE may go through a calibration process to identify a list of optimal kernels at different transmission powers.

A transfer function of the PA may be approximated by an odd series (because f(x) is odd):

$$f(x) = \sum_{n=0}^{N} c_n x |x|^{2n} + O(2N+1)$$

where N is a number of kernels, $x|x|^{2n}$ is an nth kernel, $c_n$ is an NL coefficient, and $O(2N+1)$ is a small error in the order of $2N+1$. For low transmission power on the signal x, the network node may achieve small error (for example, with a low EVM) with a small number of kernels. The small number of kernels may be in association with the UE generating a table that maps a recommended set of kernels to each transmission power.

In some aspects, the UE may find a lowest kernel size per each transmission power $P_{in}$ such that the EVM is satisfactorily low (for example, satisfying a threshold). A full set of candidate kernels may be large (for example, hundreds of Volterra series-based kernels) and may have a time shift. For example, the full set of candidate kernels may include $x[n]*|x[n]|^2$, $x[n]*|x[n-d]|^2$, $x[n]*x[n-d_1]*\text{conj}(x[n-d_2])$, $x[n]*|x[n-d_3]|^2$, $x[n]*|x[n]|^4$, etc.

Many exhaustive search procedures for finding the optimal kernel can be considered. For example, a brute force search would run over $$\binom{N_{possible.kernels}}{n_{kernel.size}}$$

for various kernel set sizes $n_{kernel.size}$. The UE may then chose a subset for which a set size is minimal yet still satisfies a threshold EVM.

In some aspects, the UE may iteratively test candidate kernels to identify the subset of candidate kernels to recommend for different transmission powers. For example, the UE may set a kernel size to i=1 and test $x[n]*|x[n]|^2$. The UE may test NL with the i kernels. If the EVM threshold is satisfied, the UE may recommend an associated kernel order (for example, for $P_{in}$ projection). If the EVM threshold is not satisfied, the UE may iterate i to test a subsequent kernel size until satisfaction of the EVM threshold.

An example of an indication of the recommended kernels may include a bitmap. For example, the bitmap may signal an $\text{indexMap}_{bits}$ that corresponds to enable/disable kernels out of the possible list of candidate kernels. The bitmap may be compressed, as most of the table is zeros (for example, using Huffman or differential compression).

In some aspects, the UE may describe a delay associated with a kernel (for example, a time shift) in another indication (for example, subsequent to, or preceding, the indication of the kernel), or in a same communication as the indication of the recommended kernel (or kernels). For example, the UE may indicate the delay using a different identifier.

In some aspects, the UE may indicate a portion of the subset of candidate kernels as recommended kernels using a single indication. For example, a single indicator (for example, in a bitmap) may indicate multiple candidate kernels as recommended. In some aspects, the UE and the network node may agree to a granularity of the indication (for example, a quantity of candidate kernels indicated by a single indication), or the granularity may be configured in a communication protocol. Similarly, the UE and the network node may agree to a granularity of the delays (for example, a quantity of delays indicated by a single indication), or the delays may be configured in a communication protocol.

In some aspects, in association with the UE indicating a subset of kernels as recommended kernels for a set of communications, the DPoD at the network node may have reduced complexity, which may improve power efficiency and latency (for example, fewer kernel calculations may be required). Additionally or alternatively, the indication of the subset may reduce overfitting that may otherwise be caused by using a higher quantity of kernels than what is necessary. In some aspects, the improved DPoD and improved latency may allow the UE to transmit in a wide range of transmission power while benefiting from a lower cost PA, or a reduced power supply to the PA. Additionally or alternatively, the recommend set may be independent of a precoder or beamformer, such that the recommended set may change only upon a transmission power change, which may reduce overhead that may have otherwise been used to transmit unnecessary updates.

Figure 5:
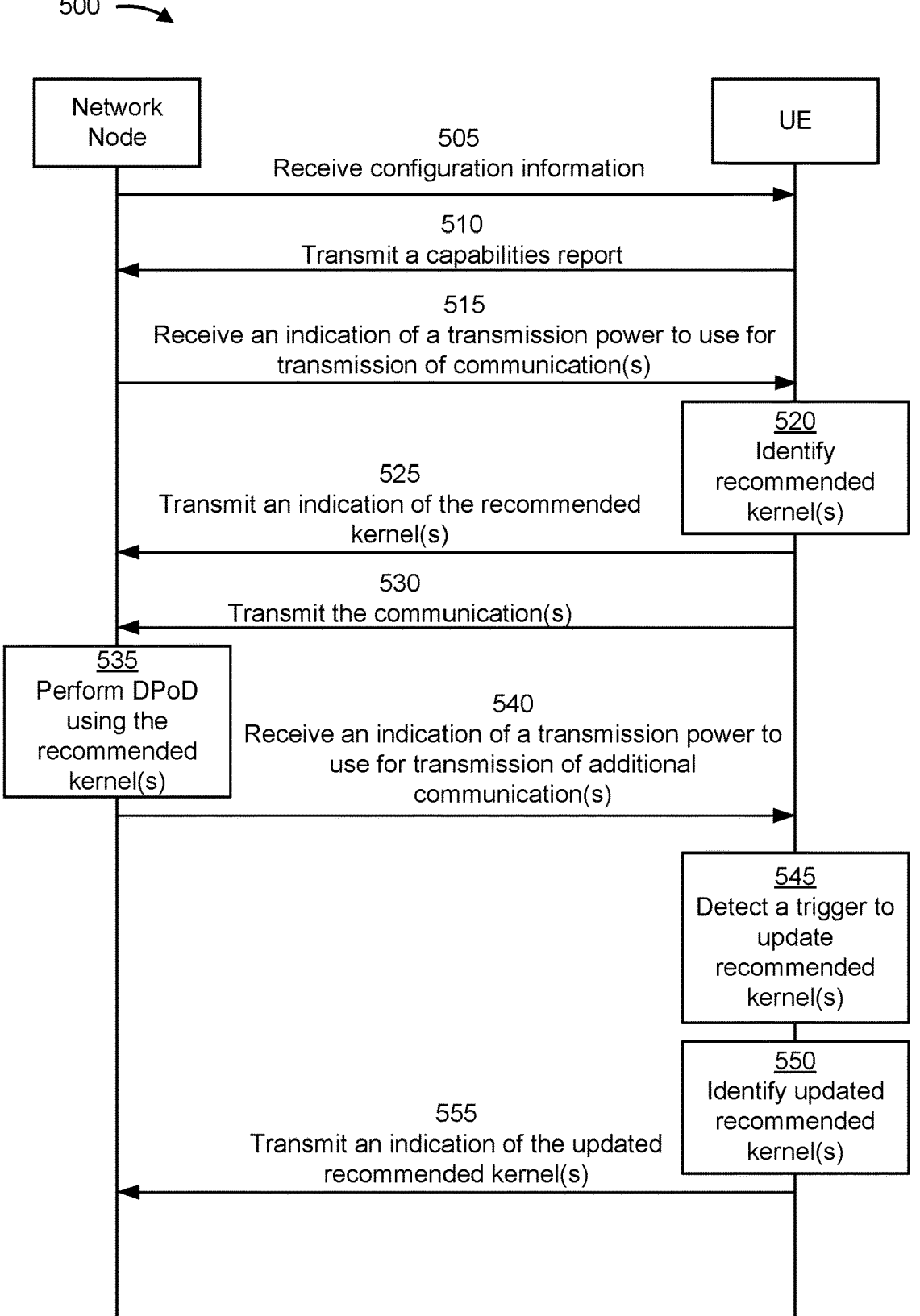
FIG. 5 is a diagram of an example associated with kernel recommendation for digital post-distortion (DPoD) correction, in accordance with the present disclosure.

FIG. 5 is a diagram of an example 500 associated with kernel recommendation for DPoD correction, in accordance with the present disclosure. As shown in FIG. 5, a network node (for example, network node 110, a CU, a DU, or an RU) may communicate with a UE (for example, UE 120). In some aspects, the network node and the UE may be part of a wireless network (for example, wireless network 100). The UE and the network node may have established a wireless connection prior to operations shown in FIG. 5.

As shown by reference number 505, the network node may transmit, and the UE may receive, configuration information. In some aspects, the UE may receive the configuration information via one or more of RRC signaling, one or more MAC control elements (CEs), or downlink control information (DCI), among other examples. In some aspects, the configuration information may include an indication of one or more configuration parameters (for example, already known to the UE or previously indicated by the network node or other network device) for selection by the UE, or explicit configuration information for the UE to use to configure the UE, among other examples.

In some aspects, the configuration information may indicate that the UE is to indicate a capability to provide one or more recommended kernels for DPoD at the network node. In some aspects, the configuration information may indicate a format for indicating the one or more recommended kernels. For example, the configuration information may indicate to use a bitmap or a codepoint configuration for indicating the one or more recommended kernels. In some aspects, the configuration information may indicate a bitmap associating bits of the second indication to respective candidate kernels of the set of candidate kernels or kernel identifiers of respective candidate kernels of the set of candidate kernels that may be referenced later in an indication of one or more recommended kernels. In some aspects, the configuration information may indicate a compression technique to use for indicating the one or more recommended kernels.

The UE may configure itself based at least in part on the configuration information. In some aspects, the UE may be configured to perform one or more operations described herein based at least in part on the configuration information.

As shown by reference number 510, the UE may transmit, and the network node may receive, a capabilities report. In some aspects, the capabilities report may indicate UE support for providing one or more recommended kernels for DPoD at the network node. In some aspects, the UE may transmit an indication of candidate kernels from which the UE may later indicate the one or more recommended kernels.

In some aspects, the configuration information described in connection with reference number 505 and the capabilities report described in connection with reference number 510 may include multiple messages. In some aspects, a first portion of the configuration information may be transmitted before the capabilities report and a second portion of the configuration information may be transmitted after the capabilities report.

As shown by reference number 515, the UE may receive, and the network node may transmit, an indication of a transmission power to use for transmission of one or more communications.

As shown by reference number 520, the UE may identify one or more recommended kernels in connection with correcting NL distortion (for example, using DPoD) of a transmission of the one or more communications. In some aspects, the UE may identify the one or more recommended kernels as being associated with the transmission power and NL characteristics of a PA of the UE used to transmit the one or more communications.

In some aspects, the one or more recommended kernels may include a subset of candidate kernels associated with performance of DPoD at the network node for communications transmitted by the UE. In some aspects, the one or more recommended kernels are associated with the transmission power and the one or more nonlinearity characteristics of the power amplifier in association with an offline calibration process. In some aspects, a quantity of kernels indicated in the one or more recommended kernels may be in connection with a quantity (for example, a minimum quantity) of kernels associated with satisfaction of an EVM threshold.

As shown by reference number 525, the UE may transmit, and the network node may receive, an indication of the one or more recommended kernels. In some aspects, the UE may transmit the indication of the one or more recommended kernels via a control channel (for example, PUCCH) or a data channel (for example, PUSCH). In some aspects, the UE may further indicate a time shift associated with the one or more recommended kernels. In some aspects, different recommended kernels may have different respective time shifts.

As shown by reference number 530, the UE may transmit, and the network node may receive, the one or more communications. In some aspects, the one or more communications may have NL distortion associated with a PA of the UE operating in an NL region.

As shown by reference number 535, the network node may perform DPoD using the one or more recommended kernels. In some aspects, the network node may perform DPoD associated with identifying a kernel of the one or more recommended kernels and correcting NL of the one or more communications using the kernel.

As shown by reference number 540, the UE may receive, and the network node may transmit, an indication of a transmission power to use for transmission of one or more additional communications.

As shown by reference number 545, the UE may detect a trigger to update the one or more recommended kernels. In some aspects, the UE may detect a trigger in connection with evaluating whether the one or more recommended kernels should include a new kernel or should exclude an indicated kernel in connection with a change in transmission parameters. For example, the UE may evaluate whether the one or more recommended kernels should be updated in connection with an indication of a change from the transmission power to an updated transmission power to use for transmission of the one or more additional communications, a change of a transmission beam used for transmission of the one or more additional communications, or a change of a PA of the UE used for transmission of the one or more additional communications, among other examples.

As shown by reference number 550, the UE may identify one or more updated recommended kernels. In some aspects, the UE may identify the one or more updated recommended kernels as including an additional kernel not indicated in the indication of the one or more recommended kernels, or as excluding a kernel indicated in the indication of the one or more recommended kernels, described in connection with reference number 525.

In some aspects, the UE may identify the one or more updated recommended kernels as being a same set of one or more kernels as identified in connection with reference number 520. In this case, the UE may not transmit an indication of the one or more updated recommended kernels. Alternatively, the UE may transmit the indication of the one or more updated recommended kernels based at least in part on the change in the transmission parameters even if the one or more updated recommended kernels is identical to the one or more recommended kernels previously indicated.

As shown by reference number 555, the UE may transmit, and the network node may receive, an indication of the one or more updated recommended kernels. In some aspects, the UE may transmit the indication via a data channel or a control channel.

In association with the UE indicating the subset of candidate kernels, the UE and network node may reduce power consumption, computing resource consumption, and latency of a DPoD process at the network node without corrupting a demodulation EVM.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (for example, UE 120) performs operations associated with kernel recommendation for DPoD.

As shown in FIG. 6, in some aspects, process 600 may include receiving a first indication of a transmission power to use for transmission of one or more communications (block 610). For example, the UE (for example, using reception component 802 or communication manager 806, depicted in FIG. 8) may receive a first indication of a transmission power to use for transmission of one or more communications, as described above.

As further shown in FIG. 6, in some aspects, process 600 may include transmitting a second indication of one or more recommended kernels associated with performance of a DPoD operation on the one or more communications, the one or more recommended kernels being associated with the transmission power and nonlinearity characteristics of a power amplifier of the UE used to transmit the one or more communications (block 620). For example, the UE (for example, using transmission component 804 or communication manager 806, depicted in FIG. 8) may transmit a second indication of one or more recommended kernels associated with performance of a DPoD operation on the one or more communications, the one or more recommended kernels being associated with the transmission power and nonlinearity characteristics of a power amplifier of the UE used to transmit the one or more communications, as described above.

Process 600 may include additional aspects, such as any single aspect or any combination of aspects described below or in connection with one or more other processes described elsewhere herein.

In a first aspect, process 600 includes transmitting a third indication of one or more additional recommended kernels associated with performance of a DPoD operation on one or more additional communications in association with the one or more additional recommended kernels comprising a first kernel not included in the one or more recommended kernels or excluding a second kernel included in the one or more recommended kernels.

In a second aspect, alone or in combination with the first aspect, process 600 includes transmitting a third indication of one or more additional recommended kernels associated with performance of a DPoD operation on one or more additional communications, the transmitting being associated with one or more of an indication of a change from the transmission power to an updated transmission power to use for transmission of the one or more additional communications, a change of a transmission beam used for transmission of the one or more additional communications, or a change of a power amplifier of the UE used for transmission of the one or more additional communications.

In a third aspect, alone or in combination with one or more of the first and second aspects, the one or more recommended kernels comprise a proper subset of candidate kernels associated with performance of DPoD.

In a fourth aspect, alone or in combination with one or more of the first through third aspects, the one or more recommended kernels are associated with the transmission power and the one or more nonlinearity characteristics of the power amplifier in association with an offline calibration process.

In a fifth aspect, alone or in combination with one or more of the first through fourth aspects, transmitting the second indication of the one or more recommended kernels comprises transmitting the second indication of the one or more recommended kernels via a control channel or a data channel.

In a sixth aspect, alone or in combination with one or more of the first through fifth aspects, process 600 includes transmitting a third indication of a set of candidate kernels associated with performance of DPoD, wherein the second indication of the one or more recommended kernels indicates the one or more recommended kernels from the set of candidate kernels.

In a seventh aspect, alone or in combination with one or more of the first through sixth aspects, the third indication of the set of candidate kernels indicates one or more of a bitmap associating bits of the second indication to respective candidate kernels of the set of candidate kernels, or kernel-ing identifiers of respective candidate kernels of the set of candidate kernels.

In an eighth aspect, alone or in combination with one or more of the first through seventh aspects, a quantity of kernels of the one or more recommended kernels is associated with an error vector magnitude, in association with using the one or more recommended kernels for DPoD, satisfying a threshold.

In a ninth aspect, alone or in combination with one or more of the first through eighth aspects, process 600 includes transmitting an indication of a time shift associated with the one or more recommended kernels.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network node, in accordance with the present disclosure. Example process 700 is an example where the network node (for example, network node 110) performs operations associated with kernel recommendation for DPoD.

As shown in FIG. 7, in some aspects, process 700 may include transmitting a first indication of a transmission power to use for transmission by a UE of one or more communications (block 710). For example, the network node (for example, using transmission component 904 or communication manager 906, depicted in FIG. 9) may transmit a first indication of a transmission power to use for transmission by a UE of one or more communications, as described above.

As further shown in FIG. 7, in some aspects, process 700 may include receiving a second indication of one or more recommended kernels associated with performance of a DPoD operation on the one or more communications, the one or more recommended kernels being associated with the transmission power and nonlinearity characteristics of a power amplifier of the UE used to transmit the one or more communications (block 720). For example, the network node (for example, using reception component 902 or communication manager 906, depicted in FIG. 9) may receive a second indication of one or more recommended kernels associated with performance of a DPoD operation on the one or more communications, the one or more recommended kernels being associated with the transmission power and nonlinearity characteristics of a power amplifier of the UE used to transmit the one or more communications, as described above.

Process 700 may include additional aspects, such as any single aspect or any combination of aspects described below or in connection with one or more other processes described elsewhere herein.

In a first aspect, process 700 includes performing DPoD associated with identifying a kernel of the one or more recommended kernels and correcting nonlinearity of the one or more communications using the kernel, or receiving a third indication of one or more additional recommended kernels associated with performance of a DPoD operation on one or more additional communications in association with the one or more additional recommended kernels comprising a first kernel not included in the one or more recommended kernels or excluding a second kernel included in the one or more recommended kernels.

In a second aspect, alone or in combination with the first aspect, process 700 includes receiving a third indication of one or more additional recommended kernels associated with performance of a DPoD operation on one or more additional communications, the receiving associated with one or more of an indication of a change from the transmission power to an updated transmission power for the UE to use for transmission of the one or more additional communications, a change of a transmission beam used for transmission of the one or more additional communications, or a change of a power amplifier of the UE used for transmission of the one or more additional communications.

In a third aspect, alone or in combination with one or more of the first and second aspects, the one or more recommended kernels comprise a proper subset of candidate kernels associated with performance of DPoD.

In a fourth aspect, alone or in combination with one or more of the first through third aspects, the one or more recommended kernels are associated with the transmission power and the one or more nonlinearity characteristics of the power amplifier in association with an offline calibration process.

In a fifth aspect, alone or in combination with one or more of the first through fourth aspects, receiving the second indication of the one or more recommended kernels comprises receiving the second indication of the one or more recommended kernels via a control channel or a data channel.

In a sixth aspect, alone or in combination with one or more of the first through fifth aspects, process 700 includes receiving a third indication of a set of candidate kernels associated with performance of DPoD, wherein the second indication of the one or more recommended kernels indicates the one or more recommended kernels from the set of candidate kernels.

In a seventh aspect, alone or in combination with one or more of the first through sixth aspects, the third indication of the set of candidate kernels indicates one or more of a bitmap associating bits of the second indication to respective candidate kernels of the set of candidate kernels, or kerneling identifiers of respective candidate kernels of the set of candidate kernels.

In an eighth aspect, alone or in combination with one or more of the first through seventh aspects, a quantity of kernels of the one or more recommended kernels is associated with an error vector magnitude, in association with using the one or more recommended kernels for DPoD, satisfying a threshold.

In a ninth aspect, alone or in combination with one or more of the first through eighth aspects, process 700 includes receiving an indication of a time shift associated with the one or more recommended kernels.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
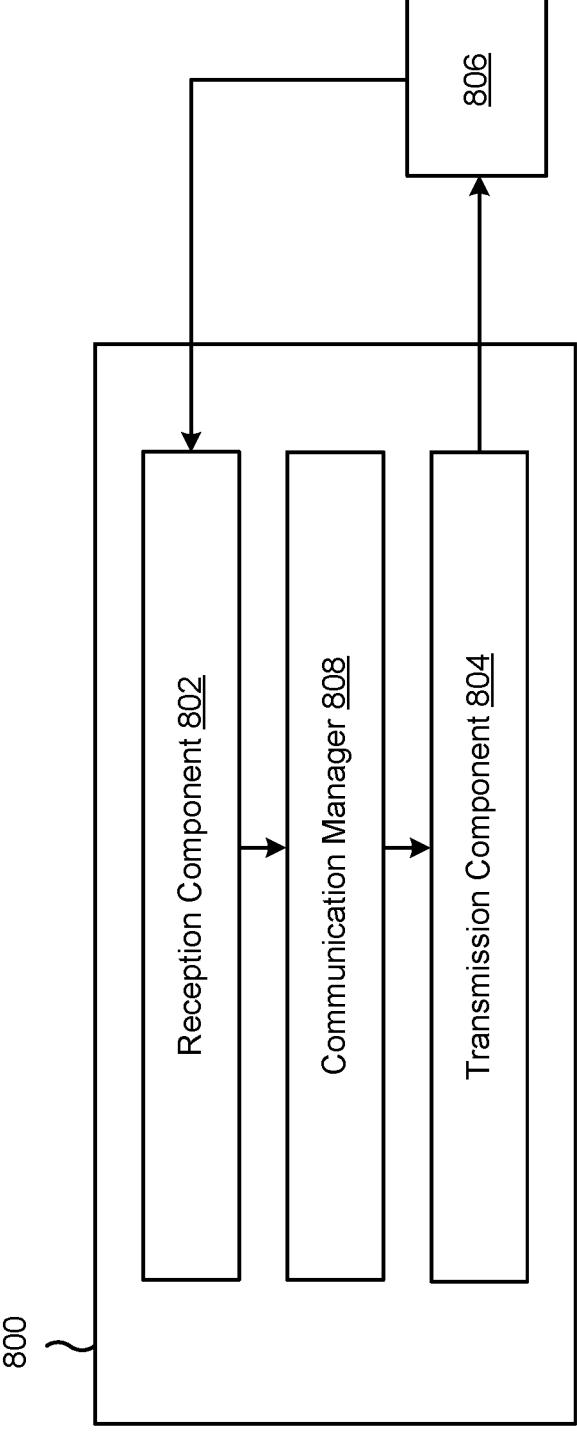
FIG. 8 is a diagram of an example apparatus for wireless communication that supports kernel recommendation for DPoD correction, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, or a communication manager 806, which may be in communication with one another (for example, via one or more buses or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 or the transmission component 804. For example, the communication manager 806 may receive information associated with configuring reception of communications by the reception component 802 or transmission of communications by the transmission component 804. Additionally, or alternatively, the communication manager 806 may generate or provide control information to the reception component 802 or the transmission component 804 to control reception or transmission of communications.

The reception component 802 may receive a first indication of a transmission power to use for transmission of one or more communications. The transmission component 804 may transmit a second indication of one or more recommended kernels associated with performance of a DPoD operation on the one or more communications, the one or more recommended kernels being associated with the transmission power and nonlinearity characteristics of a power amplifier of the UE used to transmit the one or more communications.

The transmission component 804 may transmit a third indication of one or more additional recommended kernels associated with performance of a DPoD operation on one or more additional communications in association with communications in association with the one or more additional recommended kernels comprising a first kernel not included in the one or more recommended kernels or excluding a second kernel included in the one or more recommended kernels.

The transmission component 804 may transmit a third indication of one or more additional recommended kernels associated with performance of a DPoD operation on one or more additional communications, the transmitting being associated with one or more of an indication of a change from the transmission power to an updated transmission power to use for transmission of the one or more additional communications, a change of a transmission beam used for transmission of the one or more additional communications, or a change of a power amplifier of the UE used for transmission of the one or more additional communications.

The transmission component 804 may transmit a third indication of a set of candidate kernels associated with performance of DPoD wherein the second indication of the one or more recommended kernels indicates the one or more recommended kernels from the set of candidate kernels.

The transmission component 804 may transmit an indication of a time shift associated with the one or more recommended kernels.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
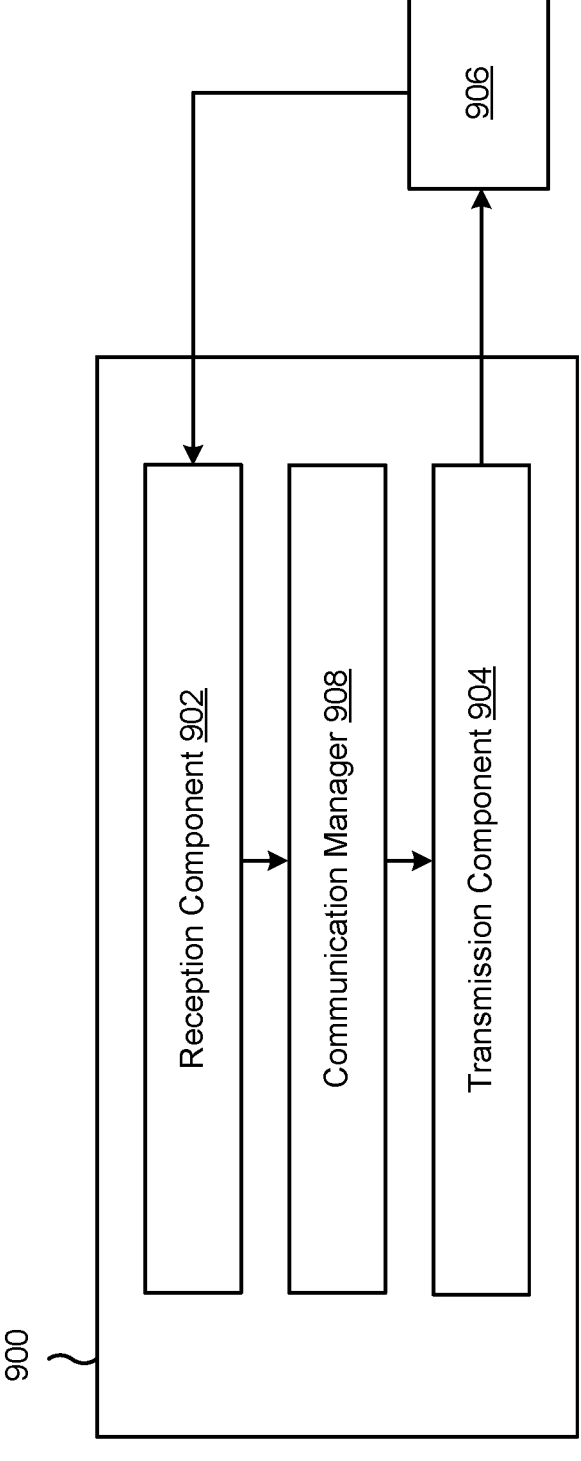
FIG. 9 is a diagram of an example apparatus for wireless communication that supports kernel recommendation for DPoD correction, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, or a communication manager 906, which may be in communication with one another (for example, via one or more buses or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 or the transmission component 904 may include or may be included in a network interface. The network interface may be configured to obtain or output signals for the apparatus 900 via one or more communications links, such as a backhaul link, a midhaul link, or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 or the transmission component 904. For example, the communication manager 906 may receive information associated with configuring reception of communications by the reception component 902 or transmission of communications by the transmission component 904. Additionally, or alternatively, the communication manager 906 may generate or provide control information to the reception component 902 or the transmission component 904 to control reception or transmission of communications.

The transmission component 904 may transmit a first indication of a transmission power to use for transmission by a UE of one or more communications. The reception component 902 may receive a second indication of one or more recommended kernels associated with performance of a DPoD operation on the one or more communications, the one or more recommended kernels being associated with the transmission power and nonlinearity characteristics of a power amplifier of the UE used to transmit the one or more communications.

The communication manager 906 may perform DPoD associated with identifying a kernel of the one or more recommended kernels and correcting nonlinearity of the one or more communications using the kernel.

The reception component 902 may receive a third indication of one or more additional recommended kernels associated with performance of a DPoD operation on one or more additional communications in association with the one or more additional recommended kernels comprising a first kernel not included in the one or more recommended kernels or excluding a second kernel included in the one or more recommended kernels.

The reception component 902 may receive a third indication of one or more additional recommended kernels associated with performance of a DPoD operation on one or more additional communications, the receiving associated with one or more of an indication of a change from the transmission power to an updated transmission power for the UE to use for transmission of the one or more additional communications, a change of a transmission beam used for transmission of the one or more additional communications, or a change of a power amplifier of the UE used for transmission of the one or more additional communications.

The reception component 902 may receive a third indication of a set of candidate kernels associated with performance of DPoD wherein the second indication of the one or more recommended kernels indicates the one or more recommended kernels from the set of candidate kernels.

The reception component 902 may receive an indication of a time shift associated with the one or more recommended kernels.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performable by a user equipment (UE), comprising: receiving a first indication of a transmission power to use for transmission of one or more communications; and transmitting a second indication of one or more recommended kernels associated with performance of a digital post distortion (DPoD) operation on the one or more communications, the one or more recommended kernels being associated with the transmission power and one or more nonlinearity characteristics of a power amplifier of the UE used to transmit the one or more communications.

Aspect 2: The method of Aspect 1, further comprising: transmitting a third indication of one or more additional recommended kernels associated with performance of a DPoD operation on one or more additional communications in association with the one or more additional recommended kernels comprising a first kernel not included in the one or more recommended kernels or excluding a second kernel included in the one or more recommended kernels.

Aspect 3: The method of any of Aspects 1-2, further comprising transmitting a third indication of one or more additional recommended kernels associated with performance of a DPoD operation on one or more additional communications, the transmitting being associated with one or more of: an indication of a change from the transmission power to an updated transmission power to use for transmission of the one or more additional communications, a change of a transmission beam used for transmission of the one or more additional communications, or a change of a power amplifier of the UE used for transmission of the one or more additional communications.

Aspect 4: The method of any of Aspects 1-3, wherein the one or more recommended kernels comprise a proper subset of candidate kernels associated with performance of DPoD.

Aspect 5: The method of any of Aspects 1-4, wherein the one or more recommended kernels are associated with the transmission power and the one or more nonlinearity characteristics of the power amplifier in association with an offline calibration process.

Aspect 6: The method of any of Aspects 1-5, wherein transmitting the second indication of the one or more recommended kernels comprises: transmitting the second indication of the one or more recommended kernels via a control channel or a data channel.

Aspect 7: The method of any of Aspects 1-6, further comprising transmitting a third indication of a set of candidate kernels associated with performance of DPoD, wherein the second indication of the one or more recommended kernels indicates the one or more recommended kernels from the set of candidate kernels.

Aspect 8: The method of Aspect 7, wherein the third indication of the set of candidate kernels indicates one or more of: a bitmap associating bits of the second indication to respective candidate kernels of the set of candidate kernels, or kernel identifiers of respective candidate kernels of the set of candidate kernels.

Aspect 9: The method of any of Aspects 1-8, wherein a quantity of kernels of the one or more recommended kernels is associated with an error vector magnitude, in association with using the one or more recommended kernels for DPoD, satisfying a threshold.

Aspect 10: The method of any of Aspects 1-9, further comprising: transmitting an indication of a time shift associated with the one or more recommended kernels.

Aspect 11: A method of wireless communication performable by a network node, comprising: transmitting a first indication of a transmission power to use for transmission by a user equipment (UE) of one or more communications; and receiving a second indication of one or more recommended kernels associated with performance of a digital post distortion (DPoD) operation on the one or more communications, the one or more recommended kernels being associated with the transmission power and nonlinearity characteristics of a power amplifier of the UE used to transmit the one or more communications.

Aspect 12: The method of Aspect 11, further comprising: performing DPoD associated with identifying a kernel of the one or more recommended kernels and correcting nonlinearity of the one or more communications using the kernel; or receiving a third indication of one or more additional recommended kernels associated with performance of a DPoD operation on one or more additional communications in association with the one or more additional recommended kernels comprising a first kernel not included in the one or more recommended kernels or excluding a second kernel included in the one or more recommended kernels.

Aspect 13: The method of any of Aspects 11-12, further comprising receiving a third indication of one or more additional recommended kernels associated with performance of a DPoD operation on one or more additional communications, the receiving associated with one or more of: an indication of a change from the transmission power to an updated transmission power for the UE to use for transmission of the one or more additional communications, a change of a transmission beam used for transmission of the one or more additional communications, or a change of a power amplifier of the UE used for transmission of the one or more additional communications.

Aspect 14: The method of any of Aspects 11-13, wherein the one or more recommended kernels comprise a proper subset of candidate kernels associated with performance of DPoD.

Aspect 15: The method of any of Aspects 11-14, wherein the one or more recommended kernels are associated with the transmission power and the one or more nonlinearity characteristics of the power amplifier in association with an offline calibration process.

Aspect 16: The method of any of Aspects 11-15, wherein receiving the second indication of the one or more recommended kernels comprises: receiving the second indication of the one or more recommended kernels via a control channel or a data channel.

Aspect 17: The method of any of Aspects 11-16, further comprising receiving a third indication of a set of candidate kernels associated with performance of DPoD, wherein the second indication of the one or more recommended kernels indicates the one or more recommended kernels from the set of candidate kernels.

Aspect 18: The method of Aspect 17, wherein the third indication of the set of candidate kernels indicates one or more of: a bitmap associating bits of the second indication to respective candidate kernels of the set of candidate kernels, or kernel identifiers of respective candidate kernels of the set of candidate kernels.

Aspect 19: The method of any of Aspects 11-18, wherein a quantity of kernels of the one or more recommended kernels is associated with an error vector magnitude, in association with using the one or more recommended kernels for DPoD, satisfying a threshold.

Aspect 20: The method of any of Aspects 11-19, further comprising: receiving an indication of a time shift associated with the one or more recommended kernels.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of"). The phrases "in association with" or "associated with" may include an association in either direction of dependency. For example, element A described as being associated with element B may indicate that element A is based on element B or that element B is based on element A.

What is claimed is:

1. A UE for wireless communication, comprising:
at least one memory; and
at least one processor coupled with the at least one memory, the at least one processor operable to cause the UE to:
    receive a first indication of a transmission power to use for transmission of one or more communications; and
    transmit a second indication of one or more recommended kernels associated with performance of a digital post distortion (DPOD) operation on the one or more communications, the one or more recommended kernels being associated with the transmission power and nonlinearity characteristics of a power amplifier of the UE used to transmit the one or more communications.

2. The UE of claim 1, wherein the at least one processor is further operable to cause the UE to:
transmit a third indication of one or more additional recommended kernels associated with performance of a DPOD operation on one or more additional communications in association with the one or more additional recommended kernels comprising a first kernel not included in the one or more recommended kernels or excluding a second kernel included in the one or more recommended kernels.

3. The UE of claim 1, wherein the at least one processor is further operable to cause the UE to transmit a third indication of one or more additional recommended kernels associated with performance of a DPOD operation on one or more additional communications, the transmitting being associated with one or more of:
an indication of a change from the transmission power to an updated transmission power to use for transmission of the one or more additional communications,
a change of a transmission beam used for the transmission of the one or more additional communications, or
a change of a power amplifier of the UE used for the transmission of the one or more additional communications.

4. The UE of claim 1, wherein the one or more recommended kernels comprise a proper subset of candidate kernels associated with the performance of the DPOD operation.

5. The UE of claim 1, wherein the one or more recommended kernels are associated with the transmission power and the one or more nonlinearity characteristics of the power amplifier in association with an offline calibration process.

6. The UE of claim 1, wherein, to cause the UE to transmit the second indication of the one or more recommended kernels, the at least one processor is operable to cause the UE to:
transmit the second indication of the one or more recommended kernels via a control channel or a data channel.

7. The UE of claim 1, wherein the at least one processor is further operable to cause the UE to transmit a third indication of a set of candidate kernels associated with the performance of the DPOD operation, wherein the second indication of the one or more recommended kernels indicates the one or more recommended kernels from the set of candidate kernels.

8. The UE of claim 7, wherein the third indication of the set of candidate kernels indicates one or more of:
a bitmap associating bits of the second indication to respective candidate kernels of the set of candidate kernels, or
kernel identifiers of the respective candidate kernels of the set of candidate kernels.

9. The UE of claim 1, wherein a quantity of kernels of the one or more recommended kernels is associated with an error vector magnitude, in association with using the one or more recommended kernels for DPOD operations, satisfying a threshold.

10. The UE of claim 1, wherein the at least one processor is further operable to cause the UE to:
transmit an indication of a time shift associated with the one or more recommended kernels.

11. The UE of claim 1, wherein, to cause the UE to transmit the second indication of the one or more recommended kernels, the at least one processor is operable to cause the UE to:
transmit, via physical uplink control channel (PUCCH) signaling, a codepoint that indicates the one or more recommended kernels.

12. A network node for wireless communication, comprising:
at least one memory; and
at least one processor coupled with the at least one memory, the at least one processor operable to cause the network node to:
    transmit a first indication of a transmission power to use for transmission by a user equipment (UE) of one or more communications; and
    receive a second indication of one or more recommended kernels associated with performance of a digital post distortion (DPOD) operation on the one or more communications, the one or more recommended kernels being associated with the transmission power and nonlinearity characteristics of a power amplifier of the UE used to transmit the one or more communications.

13. The network node of claim 12, wherein the at least one processor is further operable to cause the network node to:
perform a DPOD operation associated with identifying a kernel of the one or more recommended kernels and correcting nonlinearity of the one or more communications using the kernel; or
receive a third indication of one or more additional recommended kernels associated with performance of a DPOD operation on one or more additional communications in association with the one or more additional recommended kernels comprising a first kernel not included in the one or more recommended kernels or excluding a second kernel included in the one or more recommended kernels.

14. The network node of claim 12, wherein the at least one processor is further operable to cause the network node to receive a third indication of one or more additional recommended kernels associated with performance of a DPOD operation on one or more additional communications, the receiving associated with one or more of:

35 an indication of a change from the transmission power to an updated transmission power for the UE to use for transmission of the one or more additional communications, a change of a transmission beam used for the transmission of the one or more additional communications, or a change of a power amplifier of the UE used for the transmission of the one or more additional communications.

15. The network node of claim 12, wherein the one or more recommended kernels comprise a proper subset of candidate kernels associated with the performance of the DPOD operation.

16. The network node of claim 12, wherein the one or more recommended kernels are associated with the transmission power and the one or more nonlinearity characteristics of the power amplifier in association with an offline calibration process.

17. The network node of claim 12, wherein, to cause the network node to receive the second indication of the one or more recommended kernels, the at least one processor is operable to cause the network node to:

receive the second indication of the one or more recommended kernels via a control channel or a data channel.

18. The network node of claim 12, wherein the at least one processor is further operable to cause the network node to receive a third indication of a set of candidate kernels associated with the performance of the DPOD operation, wherein the second indication of the one or more recommended kernels indicates the one or more recommended kernels from the set of candidate kernels.

19. The network node of claim 18, wherein the third indication of the set of candidate kernels indicates one or more of:

a bitmap associating bits of the second indication to respective candidate kernels of the set of candidate kernels, or kernel identifiers of the respective candidate kernels of the set of candidate kernels.

20. The network node of claim 12, wherein a quantity of kernels of the one or more recommended kernels is associated with an error vector magnitude, in association with using the one or more recommended kernels for DPOD operations, satisfying a threshold.

21. The network node of claim 12, wherein the at least one processor is further operable to cause the network node to:

receive an indication of a time shift associated with the one or more recommended kernels.

22. A method of wireless communication performable by a user equipment (UE), comprising:

receiving a first indication of a transmission power to use for transmission of one or more communications; and transmitting a second indication of one or more recommended kernels associated with performance of a digital post distortion (DPOD) operation on the one or more communications, the one or more recommended kernels being associated with the transmission power and nonlinearity characteristics of a power amplifier of the UE used to transmit the one or more communications.

23. The method of claim 22, further comprising transmitting a third indication of one or more additional recommended kernels associated with performance of a DPOD operation on one or more additional communications, the transmitting being associated with one or more of:

an indication of a change from the transmission power to an updated transmission power to use for transmission of the one or more additional communications, a change of a transmission beam used for the transmission of the one or more additional communications, or a change of a power amplifier of the UE used for the transmission of the one or more additional communications.

24. The method of claim 22, wherein the one or more recommended kernels comprise a proper subset of candidate kernels associated with the performance of the DPOD operation.

25. The method of claim 22, wherein transmitting the second indication of the one or more recommended kernels comprises:

transmitting the second indication of the one or more recommended kernels via a control channel or a data channel.

26. The method of claim 22, further comprising transmitting a third indication of a set of candidate kernels associated with the performance of the DPOD operation, wherein the second indication of the one or more recommended kernels indicates the one or more recommended kernels from the set of candidate kernels.

27. A method of wireless communication performable by a network node, comprising:

transmitting a first indication of a transmission power to use for transmission by a user equipment (UE) of one or more communications; and receiving a second indication of one or more recommended kernels associated with performance of a digital post distortion (DPOD) operation on the one or more communications, the one or more recommended kernels being associated with the transmission power and nonlinearity characteristics of a power amplifier of the UE used to transmit the one or more communications.

28. The method of claim 27, further comprising: performing a DPOD operation associated with identifying a kernel of the one or more recommended kernels and correcting nonlinearity of the one or more communications using the kernel; or receiving a third indication of one or more additional recommended kernels associated with performance of a DPOD operation on one or more additional communications in association with the one or more additional recommended kernels comprising a first kernel not included in the one or more recommended kernels or excluding a second kernel included in the one or more recommended kernels.

29. The method of claim 27, wherein the one or more recommended kernels comprise a proper subset of candidate kernels associated with the performance of the DPOD operation.

30. The method of claim 27, wherein the one or more recommended kernels are associated with the transmission power and the one or more nonlinearity characteristics of the power amplifier in association with an offline calibration process.

* * * * *